(12) United States Patent
Consani et al.

(10) Patent No.: US 11,739,828 B2
(45) Date of Patent: Aug. 29, 2023

(54) GEAR TRANSMISSION UNIT WITH A FORCED LUBRICATION SYSTEM INCLUDING ONE OR MORE LUBRICANT DISTRIBUTION BOXES

(71) Applicant: FCA Italy S.p.A., Turin (IT)

(72) Inventors: Marco Consani, Turin (IT); Gianluigi Pregnolato, Turin (IT)

(73) Assignee: FCA Italy S.p.A., Turin (IT)

( * ) Notice: Subject to any disclaimer, the term of this patent is extended or adjusted under 35 U.S.C. 154(b) by 96 days.

(21) Appl. No.: 17/082,139

(22) Filed: Oct. 28, 2020

(65) Prior Publication Data

US 2021/0180683 A1 Jun. 17, 2021

(30) Foreign Application Priority Data

Dec. 12, 2019 (EP) .................................... 19215548

(51) Int. Cl.
*F16H 57/04* (2010.01)
*F16H 57/021* (2012.01)

(52) U.S. Cl.
CPC ....... *F16H 57/0471* (2013.01); *F16H 57/021* (2013.01); *F16H 57/0423* (2013.01); *F16H 57/0424* (2013.01); *F16H 57/0436* (2013.01); *F16H 57/0456* (2013.01)

(58) Field of Classification Search
CPC ............. F16H 57/0423; F16H 57/0424; F16H 57/0456; F16H 57/0426
See application file for complete search history.

(56) References Cited

U.S. PATENT DOCUMENTS

| | | | |
|---|---|---|---|
| 3,834,248 A * | 9/1974 | Caliri | F16F 15/162 |
| | | | 74/467 |
| 4,429,587 A | 2/1984 | Finn, III et al. | |
| 9,435,424 B2 * | 9/2016 | Matsuda | F16H 57/0456 |
| 9,970,527 B2 * | 5/2018 | Smith | F16H 57/0436 |
| 11,268,451 B2 * | 3/2022 | Di Giovanni | F02C 7/36 |
| 2013/0283972 A1 * | 10/2013 | Yamamoto | F16H 37/065 |
| | | | 903/902 |

(Continued)

FOREIGN PATENT DOCUMENTS

| | | | |
|---|---|---|---|
| DE | 102017204451 A1 * | 9/2018 | ............... B61C 9/50 |
| EP | 3181951 A1 | 6/2017 | |
| JP | S53132653 A | 11/1978 | |

OTHER PUBLICATIONS

European Search Report dated May 12, 2020. 3 pages.

*Primary Examiner* — Minh Truong
(74) *Attorney, Agent, or Firm* — RMCK Law Group PLC

(57) ABSTRACT

A gear transmission unit, particularly for a motor-vehicle, is provided with a forced lubrication system for lubricating rolling bearings and/or further inner components of the transmission unit. The unit is provided with one or more accessory elements in the form of lubricant distribution boxes. Each distribution box has a hollow body rigidly connected to the casing of the unit adjacent to a respective channel outlet which supplies a flow of lubricant under pressure. The hollow body defines an inner lubricant distribution chamber and has an inlet connected to the channel outlet and two or more outlets connected to further conduits for channels or chambers, for supplying the flow of lubricant under pressure in parallel to various components to be lubricated inside the transmission casing.

5 Claims, 5 Drawing Sheets

(56) References Cited

U.S. PATENT DOCUMENTS

| | | |
|---|---|---|
| 2014/0174857 A1 | 6/2014 | Matsuda et al. |
| 2016/0369884 A1* | 12/2016 | Otto .................... F16H 57/0424 |
| 2018/0106357 A1* | 4/2018 | Kawakami .......... F16H 57/0423 |
| 2018/0274660 A1* | 9/2018 | Kita .................... F16H 57/0424 |
| 2019/0003526 A1 | 1/2019 | Graves et al. |
| 2019/0323394 A1* | 10/2019 | Kiyokami ................. F16N 7/38 |
| 2020/0018388 A1* | 1/2020 | Alexiou .............. F16H 57/0473 |
| 2020/0132184 A1* | 4/2020 | Umeki ................ F16H 57/0476 |

* cited by examiner

GEAR TRANSMISSION UNIT WITH A FORCED LUBRICATION SYSTEM INCLUDING ONE OR MORE LUBRICANT DISTRIBUTION BOXES

CROSS-REFERENCE TO RELATED APPLICATION

This application claims priority to European Patent Application No. 19215548.9 filed Dec. 12, 2019. The disclosure of the above application is incorporated herein by reference in its entirety.

FIELD OF THE INVENTION

The invention relates to a gear transmission unit, particularly for a motor-vehicle, of the type comprising:
- a supporting casing,
- a plurality of shafts rotatably supported within the supporting casing by means of respective rolling bearings,
- a plurality of toothed wheels carried by said shafts and meshing with each other,
- a forced lubrication system for lubricating said rolling bearings and/or further internal components of the transmission unit, said forced lubrication system including:
- a supply pump for supplying lubricant, and
- a plurality of channels formed within walls of said supporting casing of the transmission unit, for bringing the lubricant up to the internal components to be lubricated.

PRIOR ART

Transmission units of the above indicated type (such as gearshift units and reducer units for motor-vehicles) are old and have been used since long. The use of a forced lubrication system provides a relevant reduction of friction inner losses with respect to more conventional solutions of wet-type transmissions in which the lubricant is displaced inside the casing of the transmission by the movable members themselves which are provided inside the unit (such as a differential crown). In modern transmissions, an improved efficiency is obtained by relying on a dry-type lubrication, in which the lubricant is supplied by a pump, preferably electrically actuated, to a network of channels formed within the casing of the transmission unit.

In some known transmissions, in order to reduce the complexity of the network of channels for the lubricant, a forced lubrication is provided only for the components which are located uppermost inside the casing of the transmission unit, whereas the components located in the bottom part are reached by the lubricant due to gravity, after that the lubricant has wet the components in the upper part. Naturally, this solution represents a compromise and has the drawback that it does not insure a proper and controllable lubrication of the components which are located in the bottom part of the transmission.

OBJECT OF THE INVENTION

A main object of the present invention is that of overcoming the above-mentioned drawbacks.

In particular, the object of the invention is that of providing a transmission unit which allows a proper and controllable lubrication of all its components and which can be obtained with simple and quick operations even starting from a transmission unit originally configured for operating with a forced lubrication of the components in the upper part and a lubrication by gravity of the components located in the bottom part of the transmission.

More in general, it is an object of the invention that of simplifying the configuration of the network of channels which must be provided within the structure of the transmission unit for the purpose of supplying a controllable flow of lubricant under pressure to all the components to be lubricated inside the transmission.

SUMMARY OF THE INVENTION

In view of achieving one or more of the above indicated objects, the invention provides a gear transmission unit having the features which have been indicated at the beginning of the present description, and further characterized in that it is provided with one or more accessory elements in the form of lubricants distribution boxes, in that the, or each, distribution box has a hollow body rigidly connected to the supporting casing adjacent to a respective channel outlet which supplies a forced flow of lubricant, and in that said hollow body defines an inner lubricant distribution chamber and has one inlet connected to said channel outlet and two or more outlets connected to further conduits or channels or chambers for supplying a flow of lubricant under pressure in parallel to various components to be lubricated inside the supporting casing.

Due to the provision of the above-mentioned lubricant distribution boxes, the operations which are necessary for adapting a transmission unit to operate with a proper and controllable lubrication of all the inner components of the unit are rendered extremely simple, quick and inexpensive.

BRIEF DESCRIPTION OF THE DRAWINGS

Further features and advantageous of the invention will become apparent from the description which follows, with reference to the annexed drawings, given purely by way of non-limiting example, in which.

DETAILED DESCRIPTION OF ONE EMBODIMENT

Figure 1:
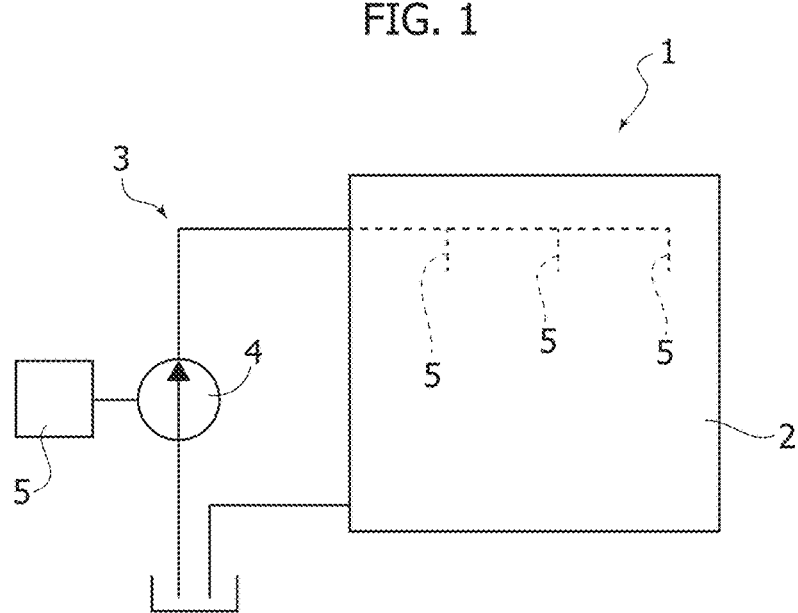
FIG. 1 is a diagram of the lubrication system of a transmission unit.

In FIG. 1, reference 1 generally designates a gear transmission unit, such as a motor-vehicle gearshift or a gear reducer unit for a motor-vehicle electric motor. Unit 1 includes a supporting casing 2 in which there are rotatably mounted, by means of rolling bearings, two or more shafts carrying toothed wheels meshing with each other. The transmission unit 1 is provided with a forced lubrication system 3 including a supply pump 4 driven by electric model 5 for supplying a flow of lubricant (oil) under pressure to a network of inner channels 5 formed in the walls of the supporting casing 2.

The example shown herein relates to a transmission unit originally configured with a network of channels 5 provided for supplying a flow of lubricant under pressure directly to the rolling bearings, and/or other inner components of the unit, which are located in the uppermost part inside the casing 2. In the known solution, the components located in the lowermost part are reached by the lubricant, due to gravity, after that the lubricant has wet the components in the uppermost part. As indicated in the foregoing, this solution does not insure a proper and controllable lubrication of all the inner components of the unit. The idea at the basis of the present invention is that of transforming a transmission unit configured as described with extremely simple and inexpensive operation, in order to obtain a direct forced lubrication also of the components located in the lowermost part inside the unit.

Figure 2:
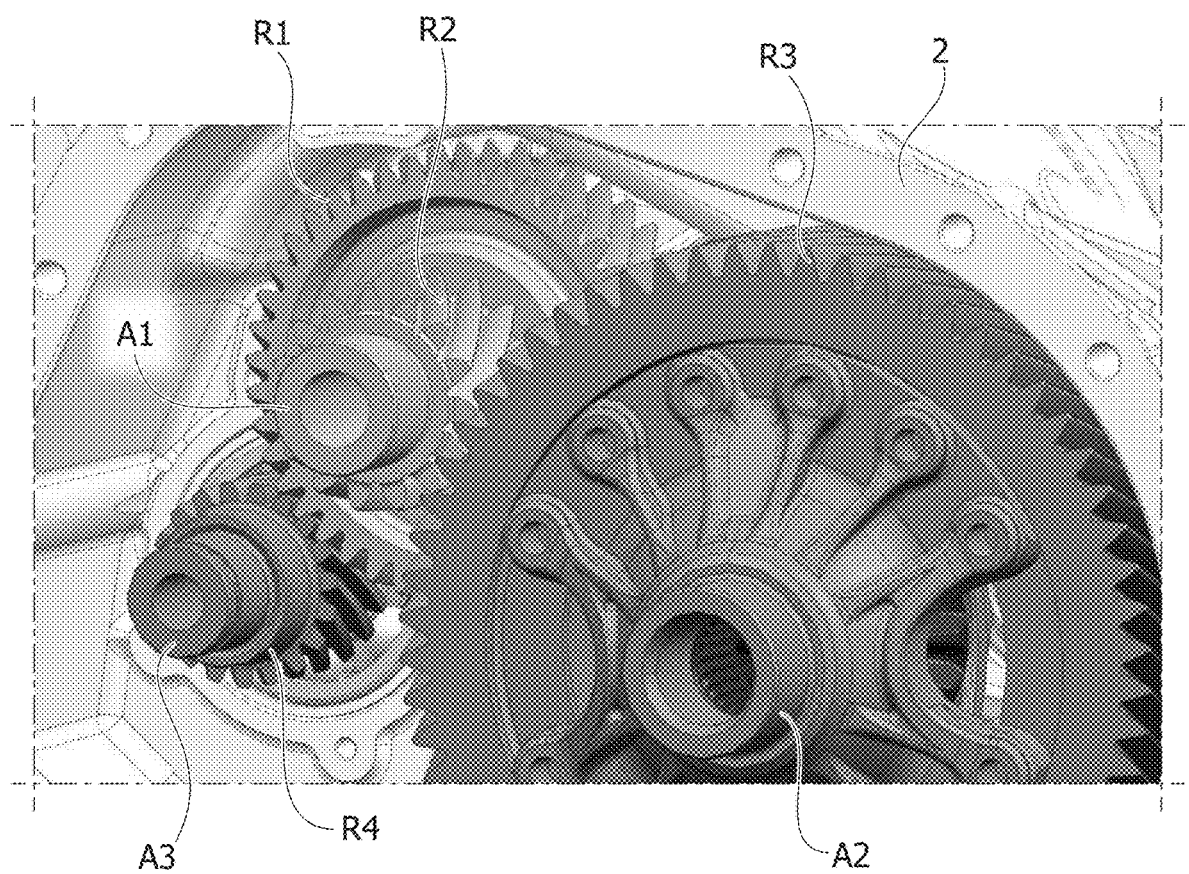
FIG. 2 is a perspective view of a detail of a gear transmission unit (namely a reducer unit for an electric motor unit of a motor-vehicle)
Figure 3:
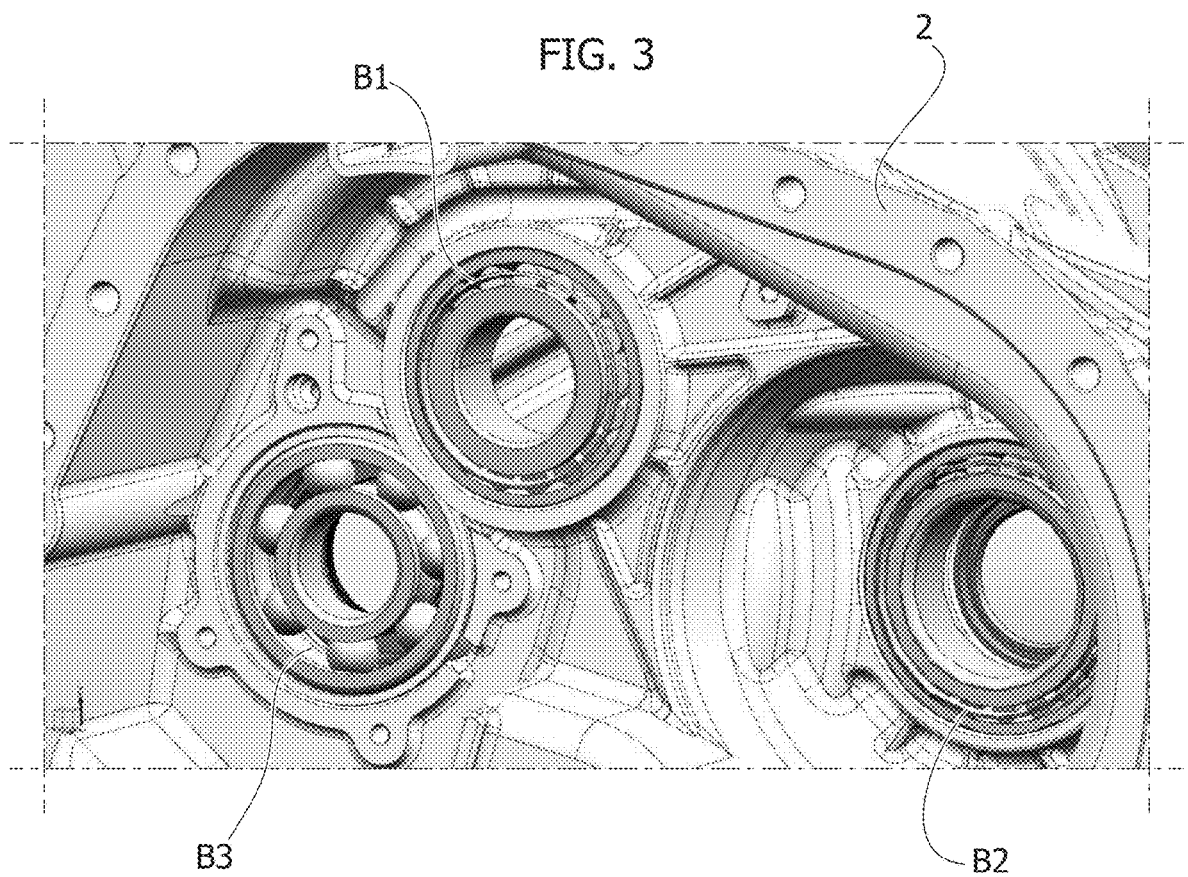
FIG. 3 shows the same detail of FIG. 2 with the toothed wheels removed, in order to show the rolling bearings for supporting the shafts on which the toothed wheels are mounted.

FIG. 2 shows a detail of toothed wheels R1, R2, R3, R4 arranged inside of the unit 1. The toothed wheels R1-R4 are mounted on shafts A1, A2, A3, which are parallel to each other and are rotatably supported inside of the supporting casing 2 of the unit 1 by means of rolling bearings B1, B2, B3 (FIG. 3).

Figure 4:
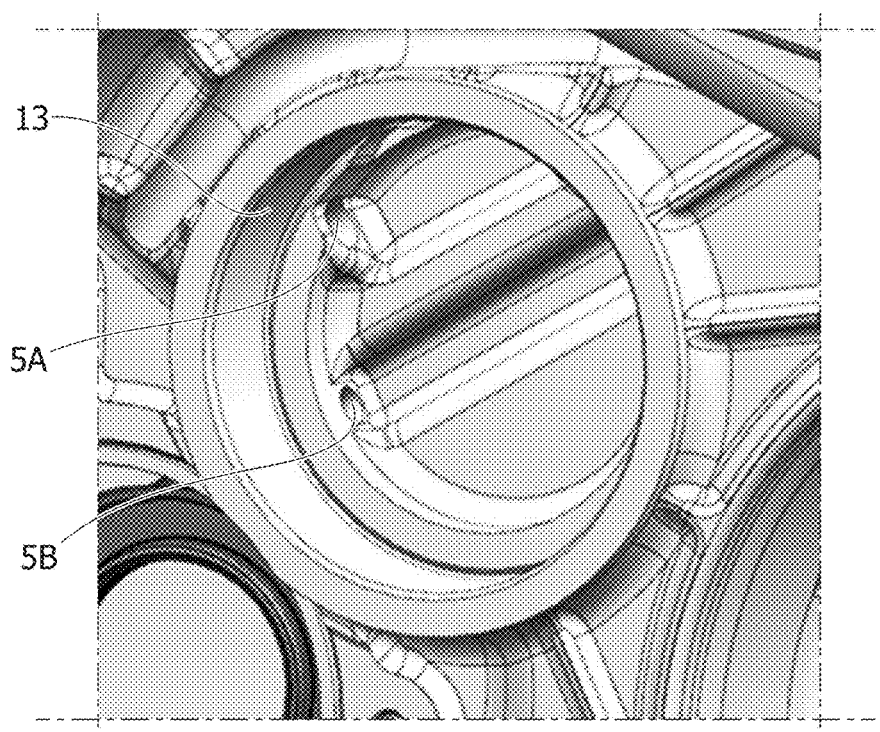
FIG. 4 is a further perspective view and at an enlarged scale of a detail of FIG. 3, with a rolling bearing removed, in order to show the outlets of the channels for supplying a flow of lubricant under pressure.

By way of example, in a transmission unit according to the prior art, the lubrication of the rolling bearing B1 is obtained by supplying a flow of lubricant under pressure up to the surface of the seat which receives the bearing. For this purpose, a channel 5 for supplying the flow of lubricant coming from the pump 4 opens out at a channel outlet 5A at the surface of seat 13 for the bearing (FIG. 4).

In a transmission unit according to the known art, the forced flow of lubricant which exits from the outlet 5A wets the bearing B1, after which it continues to flow by gravity towards the lowermost part inside the supporting casing, so as to lubricate the bearings and/or other components located in the lowermost part inside the casing 2.

In one exemplary embodiment of the transmission unit according to the invention, at the seat of the rolling bearing B1 there is provided a lubricant distribution box S. In the illustrated example, the box S comprises a hollow body of plastic material, defined and by a box element S1 and a lid S2 secured in any known way (such as by welding or glue) to the box element S1.

Figure 5:
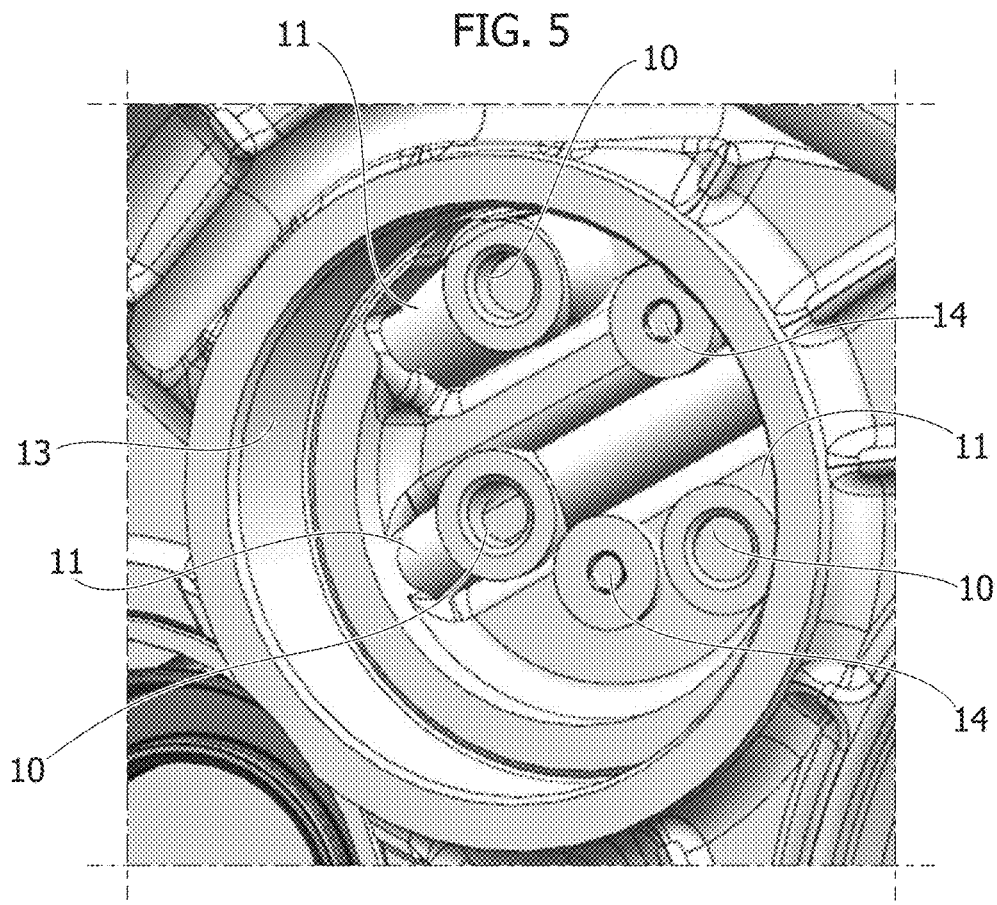
FIG. 5 shows the same detail of FIG. 4, in the case of a transmission unit according to the invention, in which two the outlets of the channels for supplying the lubricant there have been associated connecting members for connection to a lubricant distribution box.
Figure 6:
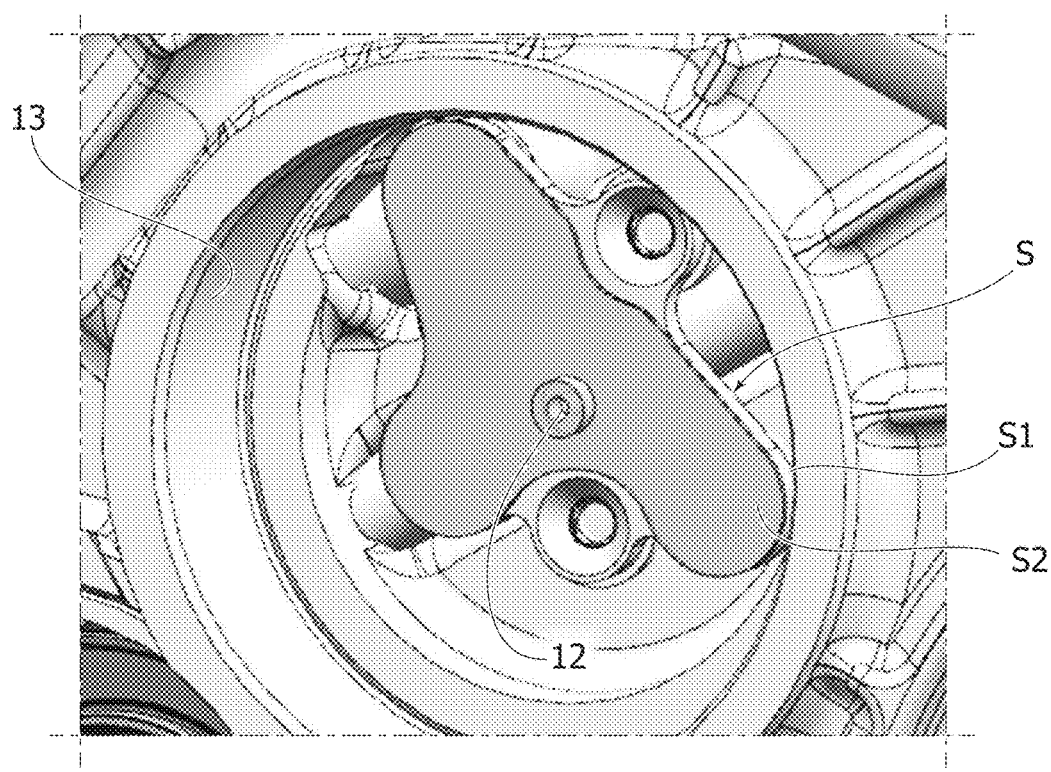
FIG. 6 shows the same detail of FIG. 5, with the distribution box mounted at the connecting members for the lubricant.

Also with reference to the illustrated example, the box element S1 incorporates two connecting portions 6 having holes 7 for engagement of securing screws for securing the distribution box S to the structure of the transmission unit (in which holes 14 are formed for engagement of the screws—FIG. 5).

The inner chambers C defined between the box element S1 and of the lid S2 constitutes a lubricant distribution chamber. The main wall of the box element S1 has three apertures 8, surrounded by necks 9 projecting from the outer surface of element S1.

Figure 7:
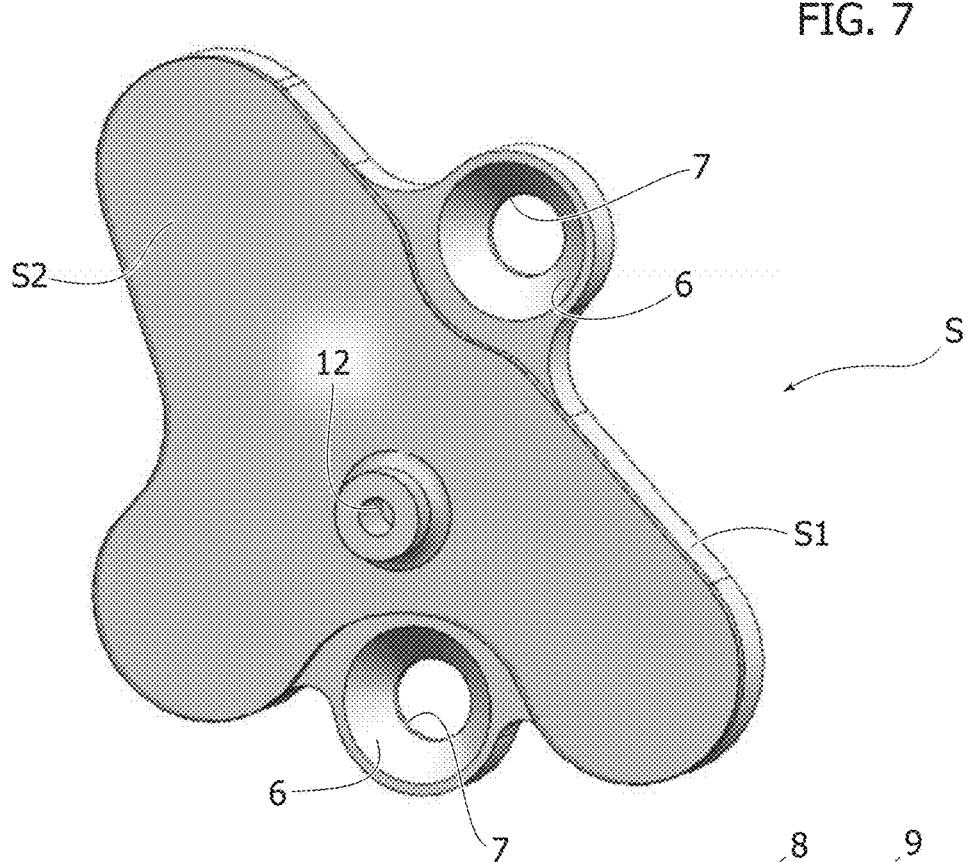
FIG. 7 is a perspective view of the transmission box, including a box body and a lid secured thereto.
Figure 8:
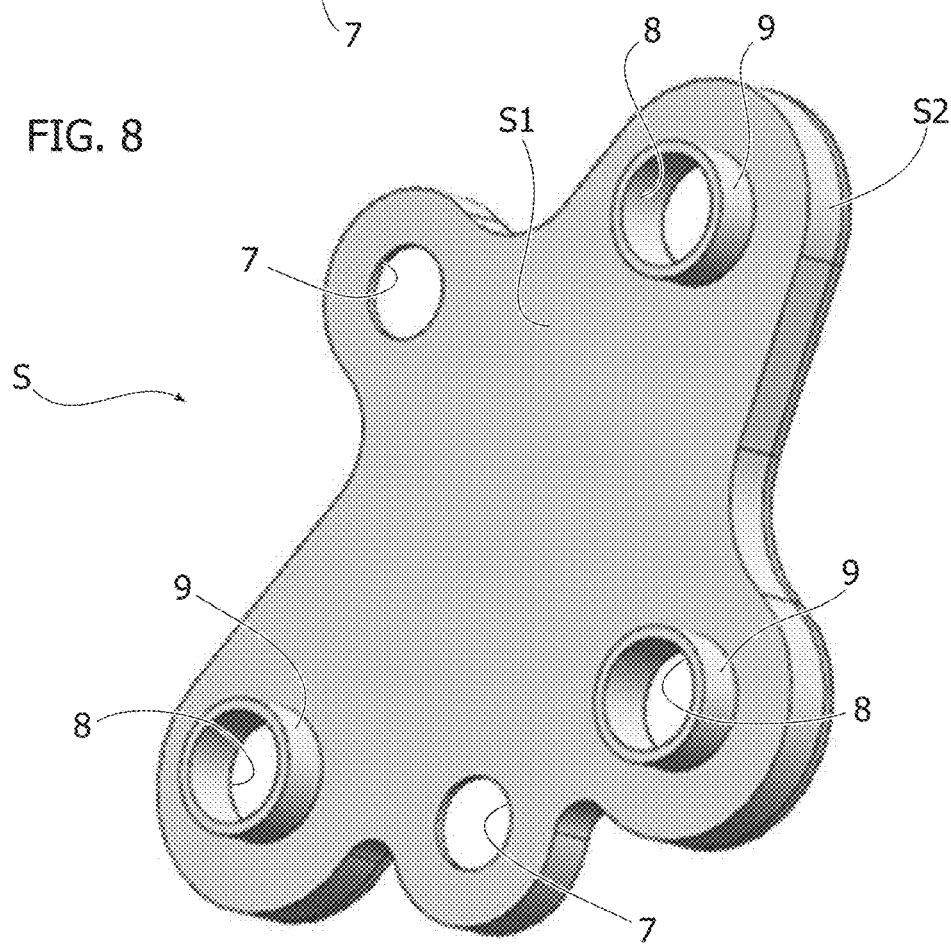
FIG. 8 is a perspective view of the body of the distribution box, on the side opposite to that of FIG. 7.
Figure 9:
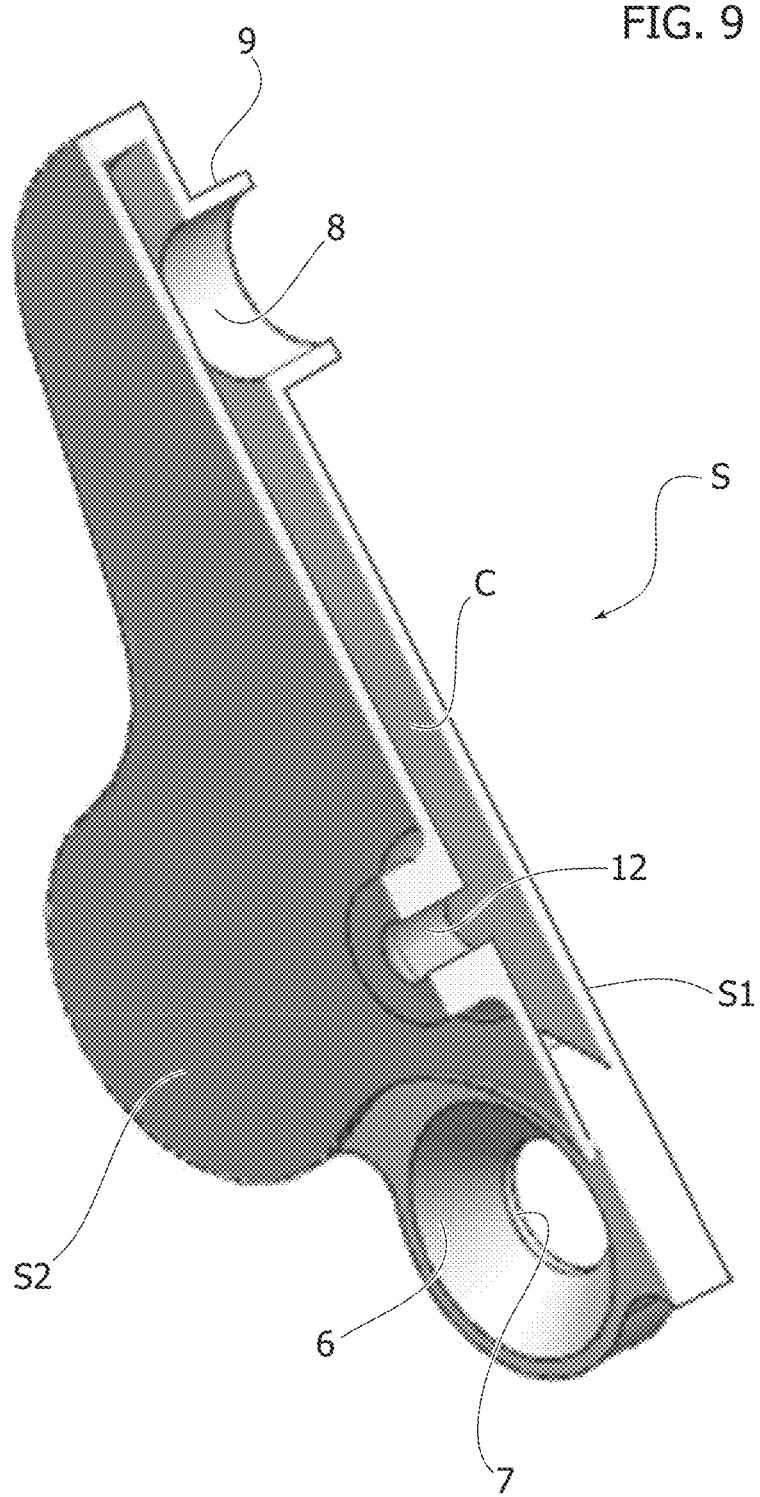
FIG. 9 is a perspective view in cross-section of the distribution box.

One of the holes 8 is used as an inlet aperture communicating with the channel outlet 5A which brings the lubricant flow coming from the supply pump. A hole 12 formed in the lid S (FIG. 7) is used as an outlet for lubrication of the seat of the bearing B1. Other two holes 8 are used as outlets which supply the flow of lubricant under pressure to other channels or conduits (one of which is designated by 5B in FIG. 4) which bring the lubricant to other components to be lubricated, for example located in the lowermost part of the unit. With reference to FIG. 5, there are provided that connecting members 11 for connection of outlets 8 of the distribution box to channels which lead the lubricant in parallel to different users. The connecting members 11 have outer portions 10 mounted around the necks 9 of box S.

Naturally, the configuration of the distribution box S may widely vary with respect to what is shown purely by way of example. Similarly, the position of one or more transmission boxes S inside the transmission casing can be selected and optimized on the basis of the specific configuration of the transmission casing, on the basis of the position of the inner components to be lubricated and on the basis of the need to obtain the greatest possible simplification of the network of channels which must be formed within the walls of the casing of the transmission unit.

Also in the case of the illustrated example, the material constituting the distribution box S is a plastic material, but the use of metal material is not excluded. The number and dimension of holes 8 to be used for defining the inlet and at the outlets of each distribution box are of course determined as a function of the specific needs.

In the illustrated example, the holes 8 have axes orthogonal with respect to the general plane of the distribution box S, but they could be also provided on the lateral wall of the box, for defining one radial inlet and/or radial outlets.

As it is clearly apparent from the present description, the distribution box S has preferably a substantially flattened configuration, so that it can be housed within the seat of a rolling bearing of a transmission unit. However, it is to be understood that the configuration of the body of the box is predetermined as a function of the mounting position and the space which is available.

Naturally, while the principle of the invention remains the same, the embodiments may widely vary with respect to what has been described and illustrated purely by way of example, without departing from the scope of the invention as defined in the annexed claims.

What is claimed is:

1. A gear transmission unit for a motor-vehicle, comprising:
 a supporting casing,
 a plurality of shafts rotatably supported within the supporting casing by means of respective rolling bearings,
 a plurality of toothed wheels carried by said plurality of shafts and meshing with each other,
 a forced lubrication system for lubricating said rolling bearings and/or further inner components of the gear transmission unit, said forced lubrication system including:
  a supply pump for supplying a lubricant, and
  a plurality of channels formed within walls of said supporting casing of the gear transmission unit, for bringing the lubricant adjacent to the inner components to be lubricated, at least some of said plurality of channels being configured for bringing a forced flow of lubricant up to one or more channel outlets adjacent to one or more of the inner components to be lubricated, wherein said transmission unit is provided with one or more accessory elements in the form of lubricant distribution boxes, wherein the, or each, lubricant distribution box has a hollow body rigidly connected to the supporting casing adjacent to a respective channel outlet which supplies a flow of lubricant under pressure, wherein the, or each, lubricant distribution box comprises a box element and a lid secured to the box element, wherein said hollow body defines an inner lubricant distribution chamber and has an inlet connected to said respective channel outlet and two or more outlets connected to further conduits or channels or chambers, for supplying the flow of lubricant under pressure in parallel to various components to be lubricated inside the supporting casing, wherein the, or each, lubricant distribution box has a substantially flattened body, with two opposite main walls respectively defined by said box element and said lid, and wherein one of the main walls has holes defining the inlet and the outlets of the distribution chamber, and wherein the, or each, lubricant distribution box is contained within a seat of the respective rolling bearing of said transmission unit.

2. The transmission unit according to claim 1, wherein the box element incorporates connecting portions provided with holes for engagement of screws for securing the distribution box to a structure of the gear transmission unit.

3. The transmission unit according to claim 1, wherein one of the outlets on the one of the main walls of the lubricant distribution box is configured to directly lubricate the respective rolling bearing housed within a same seat as the respective lubricant distribution box.

4. The transmission unit according to claim 1, wherein the, or each, lubricant distribution box is a separate and distinct structure from the gear transmission unit supporting casing.

5. The transmission unit according to claim 4, wherein the, or each, separate and distinct lubricant distribution box is secured with fasteners to the gear transmission unit supporting casing at a bottom of the seat.

\* \* \* \* \*